(12) United States Patent
McKellar et al.

(10) Patent No.: US 11,015,877 B2
(45) Date of Patent: May 25, 2021

(54) ENERGY STORAGE SYSTEMS INCLUDING THERMAL STORAGE TANKS

(71) Applicants: Battelle Energy Alliance, LLC, Idaho Falls, ID (US); Christa Stoots, Idaho Falls, ID (US)

(72) Inventors: Michael McKellar, Idaho Falls, ID (US); Richard D. Boardman, Idaho Falls, ID (US); James E. O'Brien, Idaho Falls, ID (US); Carl M. Stoots, Idaho Falls, ID (US); Piyush Sabharwall, Idaho Falls, ID (US); Shannon Bragg-Sitton, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 27 days.

(21) Appl. No.: 16/484,401

(22) PCT Filed: Jan. 19, 2018

(86) PCT No.: PCT/US2018/014440
§ 371 (c)(1),
(2) Date: Aug. 7, 2019

(87) PCT Pub. No.: WO2018/147994
PCT Pub. Date: Aug. 16, 2018

(65) Prior Publication Data
US 2019/0360763 A1 Nov. 28, 2019

Related U.S. Application Data

(60) Provisional application No. 62/456,037, filed on Feb. 7, 2017.

(51) Int. Cl.
*F24D 11/00* (2006.01)
*F28D 20/02* (2006.01)
(Continued)

(52) U.S. Cl.
CPC ......... *F28D 20/02* (2013.01); *F28D 20/0039* (2013.01); *F24H 7/0441* (2013.01);
(Continued)

(58) Field of Classification Search
CPC ................. F28D 20/02; F28D 20/0039; F28D 2020/0047; F28D 2020/0082; F24S 10/45; F24H 7/0441
(Continued)

(56) References Cited

U.S. PATENT DOCUMENTS 3,817,322 A 6/1974 Asselman et al.
3,976,584 A * 8/1976 Leifer .................... C09K 5/063
252/77

(Continued)

FOREIGN PATENT DOCUMENTS

| CN | 102582981 A | 7/2012 |
| CN | 102745427 A | 10/2012 |
| CN | 203837549 U | 9/2014 |

OTHER PUBLICATIONS

California ISO, "What the Duck Curve Tells Us About Managing a Green Grid," Fast Facts, California Independent System Operator, (2016), 4 pages.

(Continued)

*Primary Examiner* — Davis D Hwu
(74) *Attorney, Agent, or Firm* — TraskBritt

(57) ABSTRACT

Energy storage systems include a heat source and a thermal energy storage system to store thermal energy produced by the heat source. The thermal energy storage system includes a first tank containing a first salt having a first melting temperature and a second tank containing a second salt having a second melting temperature. At least one input conduit is configured for transferring thermal energy from the heat source to the first tank and second tank. A first (Continued)

output conduit is in thermal communication with the first tank. A second output conduit is in thermal communication with the second tank. Additional energy storage systems include a heat booster positioned and configured to add thermal energy to a heated heat transfer fluid prior to reaching a tank containing at least one thermal storage material. Methods include transferring thermal energy from a thermal energy source to a plurality of thermal energy storage tanks.

19 Claims, 3 Drawing Sheets

(51) Int. Cl.
 F28D 20/00 (2006.01)
 F24S 10/40 (2018.01)
 F24H 7/04 (2006.01)
(52) U.S. Cl.
 CPC ....... F24S 10/45 (2018.05); F28D 2020/0047 (2013.01); F28D 2020/0082 (2013.01)
(58) Field of Classification Search
 USPC ........................................................ 165/236
 See application file for complete search history.

(56) References Cited

U.S. PATENT DOCUMENTS

| 4,248,291 | A | 2/1981 | Jarmul |
| 4,402,188 | A | 9/1983 | Skala |
| 6,701,914 | B2 | 3/2004 | Schwarz |
| 2008/0092875 | A1 | 4/2008 | Leifer et al. |
| 2009/0173336 | A1* | 7/2009 | Leifer ................. F24D 11/0257 126/617 |
| 2010/0126706 | A1 | 5/2010 | Tsubone et al. |
| 2011/0200156 | A1* | 8/2011 | Hyde ....................... G21D 9/00 376/298 |
| 2011/0226440 | A1 | 9/2011 | Bissell et al. |
| 2013/0056170 | A1 | 3/2013 | Klemencic |
| 2015/0376487 | A1 | 12/2015 | Zeng |
| 2016/0115945 | A1 | 4/2016 | Barsi et al. |
| 2016/0187014 | A1 | 6/2016 | Becker |
| 2016/0201995 | A1* | 7/2016 | Oliva Llena .......... F28D 20/026 165/10 |

OTHER PUBLICATIONS

Garcia et al., "Nuclear Hybrid Energy Systems—Regional Studies: West Texas & Northeastern Arizona," Idaho National Laboratory, INL/EXT-15-34503, Revision 0, (2015), 120 pages.

International Search Report and Written Opinion received for PCT Patent Application No. PCT/US2018/014440, dated May 14, 2018, 10 pages.

Kuravi et al., "Thermal Energy Storage Technologies and Systems for Concentrating Solar Power Plants," Progress in Energy and Combustion Science, vol. 39, (2013), pp. 285-319.

McMillan et al., "Generation and Use of Thermal Energy in the U.S. Industrial Sector and Opportunities to Reduce its Carbon Emissions," Joint Institute for Strategic Energy Analysis (JISEA), (2016), 191 pages.

\* cited by examiner

ENERGY STORAGE SYSTEMS INCLUDING THERMAL STORAGE TANKS

CROSS-REFERENCE TO RELATED APPLICATIONS

This application is a national phase entry under 35 U.S.C. § 371 of International Patent Application PCT/US2018/014440, filed Jan. 19, 2018, designating the United States of America and published in English as International Patent Publication WO 2018/147994 A1 on Aug. 16, 2018, which claims the benefit of the filing date under Article 8 of the Patent Cooperation Treaty to U.S. Provisional Patent Application Ser. No. 62/456,037, filed Feb. 7, 2017 for "Energy Storage Systems Including thermal Storage Tanks."

STATEMENT REGARDING FEDERALLY SPONSORED RESEARCH OR DEVELOPMENT

This invention was made with government support under Contract Number DE-AC07-05-ID14517 awarded by the United States Department of Energy. The government has certain rights in the invention.

TECHNICAL FIELD

Embodiments of the present disclosure relate to systems and methods for thermal energy storage and use.

BACKGROUND

Domestic and international energy policies call for an increase in renewable energy output and a reduction in reliance on fossil fuels. Some renewable energy sources, such as wind and solar energy sources, provide a variable energy output based on, for example, daily or seasonal fluctuations in sunlight and wind. Other sources of energy, such as nuclear and fossil fuels, can provide a relatively constant energy output. In addition, at certain times of the year, energy demand fluctuates greatly based on, for example, daily, hourly, or seasonal changes in environmental temperature. This fluctuation in energy use and demand is illustrated by a plot 10 in FIG. 1, which shows actual and predicted future electricity use throughout the course of a typical spring day over the years of 2012 through 2020, as reported and predicted by the California Independent System Operator, "What the duck curve tells us about managing a green grid," 2016 (available at https://www.caiso.com/Documents/FlexibleResourcesHelpRenewables_FastFacts.pdf). The plot 10 illustrates that, for the typical spring day, there is generally a dip 12 in electrical energy demand in the afternoon and an increase 14 in electrical energy demand in the evening. The afternoon dip 12 and the evening increase 14 are predicted to become more extreme over the years analyzed. Accordingly, there are risks of overproduction of electrical power at times when renewable energy sources generate significant power but demand is low. On the other hand, a significant rate of increase in energy production may be required from a time of low demand to a time of high energy demand. Managing such differences in energy demand and energy production may be challenging, particularly as more renewable energy sources are used for energy production.

DETAILED DESCRIPTION

The following description provides specific details, such as material types, material thicknesses, and processing conditions in order to provide a thorough description of embodiments of the present disclosure. However, a person of ordinary skill in the art will understand that the embodiments of the present disclosure may be practiced without employing these specific details. Indeed, the embodiments of the present disclosure may be practiced in conjunction with conventional fabrication techniques and materials employed in the industry.

In the following detailed description, reference is made to the accompanying drawings, which form a part hereof, and in which is shown, by way of illustration, specific embodiments in which the present disclosure may be practiced. These embodiments are described in sufficient detail to enable a person of ordinary skill in the art to practice the present disclosure. However, other embodiments may be utilized, and structural, material, and other changes may be made without departing from the scope of the disclosure. The illustrations presented herein are not meant to be actual views of any particular system, device, structure, or process, but are idealized representations that are employed to describe the embodiments of the present disclosure. The drawings presented herein are not necessarily drawn to scale.

As used herein, any relational term, such as "first," "second," "third," etc., is used for clarity and convenience in understanding the disclosure and accompanying drawings and does not connote or depend on any specific preference, orientation, or order, except where the context clearly indicates otherwise.

Embodiments of the present disclosure include energy storage systems and methods for efficient management of energy production and distribution in times of low and high energy demand and in times of low and high energy production. The energy storage systems may include a thermal energy storage system for storing energy, such as at times of low demand and high production, for later use, such as at times of high demand and low production. The thermal energy storage systems of the present disclosure may, in some embodiments, include a plurality of thermal energy storage tanks containing respective phase-change thermal energy storage materials exhibiting descending melting points. The thermal energy storage tanks may be configured to store thermal energy from a heat source, such as a nuclear reactor, a concentrated solar system, or a fossil fuel plant. In some embodiments, the thermal energy storage systems may include a heat booster for adding additional thermal energy to a heat transfer fluid prior to storage. As used herein, the term "tank" means any container or vessel configured to contain a thermal energy storage material.

Figure 2:
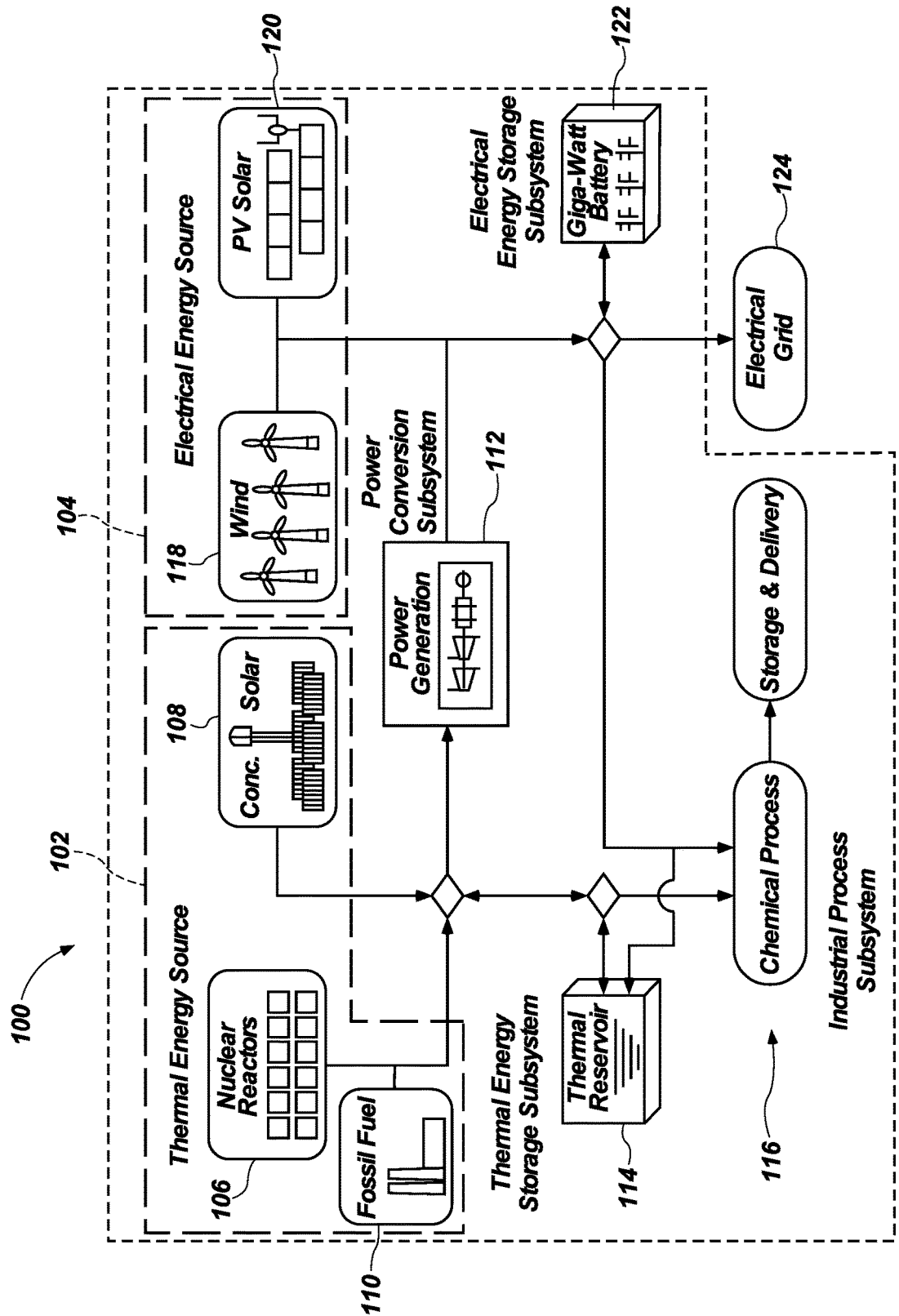
FIG. 2 shows a schematic representation of a hybrid energy system according to an embodiment of the present disclosure.

FIG. 2 shows a schematic representation of a hybrid energy system 100 according to an embodiment of the present disclosure. The hybrid energy system 100 may include a number of different energy sources, such as at least one thermal energy source 102 and at least one electrical energy source 104. The at least one thermal energy source 102 may be, for example, a nuclear reactor 106, a concentrated solar subsystem 108, and/or a fossil fuel plant 110. The primary output of the at least one thermal energy source 102 may be thermal energy in the form of a heated heat transfer fluid ("HTF"). The HTF may transfer heat from the at least one thermal energy source 102 to a thermal power conversion subsystem 112 for converting the thermal energy to electrical energy, to a thermal energy storage subsystem 114, or to an industrial process subsystem 116 (e.g., a chemical process subsystem) for consumption and use of the thermal energy transferred by the HTF. When desired, such as at times of high thermal or electrical energy demand, thermal energy stored in the thermal energy storage subsystem 114 may be transferred by the HTF to the industrial process subsystem 116 or to the thermal power conversion subsystem 112. Certain embodiments of the thermal energy storage subsystem 114 are described below with reference to FIGS. 3 and 4.

The HTF may be selected based on an expected temperature to which the HTF will be heated. For example, water or steam may be used as an HTF in certain applications. In higher temperature applications, helium or molten salts may be used.

In some embodiments, the thermal energy storage subsystem 114 and the industrial process subsystem 116 may be geographically located proximate to the at least one thermal energy source 102 to reduce significant energy loss otherwise resulting from the HTF traveling long distances and losing heat. By way of example and not limitation, the thermal energy storage subsystem 114 and the industrial process subsystem 116 may be located within about five miles (8.04 km), within about one mile (1.60 km), or within about one-half mile (0.804 km) from each other.

Referring again to FIG. 2, the at least one electrical energy source 104 may be a wind turbine farm 118 and/or a photovoltaic ("PV") solar panel system 120, for example. The primary output of the at least one electrical energy source 104 may be electricity. Electricity from the at least one electrical energy source 104 and from the thermal power conversion subsystem 112 may be transferred to an electrical energy storage subsystem (e.g., a battery) 122, to the industrial process subsystem 116 for consumption, or to an electrical grid 124 for consumption. When desired, such as at times of high electrical energy demand, electrical energy may be transferred from the electrical energy storage subsystem 122 to the industrial process subsystem 116 or to the electrical grid 124 for consumption. In some embodiments, electricity from the at least one electrical energy source 104, thermal power conversion subsystem 112, and/or electrical energy storage subsystem 122 may be used to add thermal energy to the thermal energy storage subsystem. For example, an electrical heater may be used to increase a temperature of the HTF prior to the HTF reaching the thermal energy storage subsystem 114.

The hybrid energy system 100 may improve cost and energy efficiencies for power generation and consumption. Times of low energy demand and/or high energy production generally result in relatively low energy production costs. At such times of low energy production costs, excess thermal energy can be stored in the thermal energy storage subsystem 114 and/or used by the industrial process subsystem 116. Likewise, excess electrical energy can be stored in the electrical energy storage subsystem 122, used by the industrial process subsystem, or used to add thermal energy to the thermal energy storage subsystem 114 (e.g., via an electrical heater).

Figure 1:
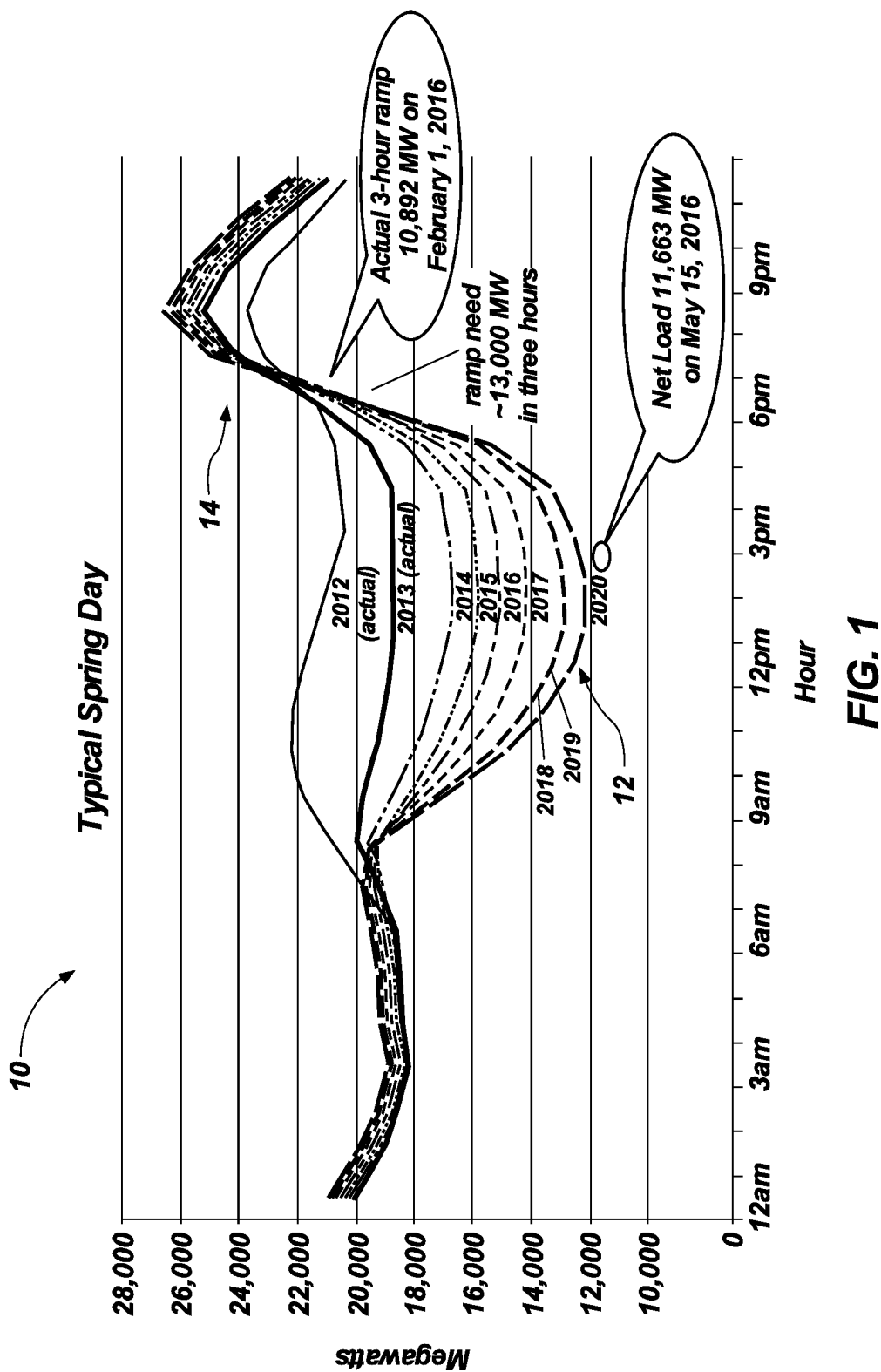
FIG. 1 shows a plot of actual and predicted future electricity use throughout the course of a typical spring day over a number of years.

At times of high energy demand and/or low energy production, relatively high energy production costs may exist. At such times of high energy production costs, the excess thermal energy stored in the thermal energy storage subsystem 114 and the excess electrical energy stored in the electrical energy storage subsystem 122 may be released and used by, for example, the electrical grid 124. The hybrid energy system 100 may be used in this manner to meet the demands of large fluctuations in energy production and consumption, as described above with reference to FIG. 1. Accordingly, overall energy production and consumption may be efficiently managed using the hybrid energy system 100, which may result in a reduction of overall energy costs.

Figure 3:
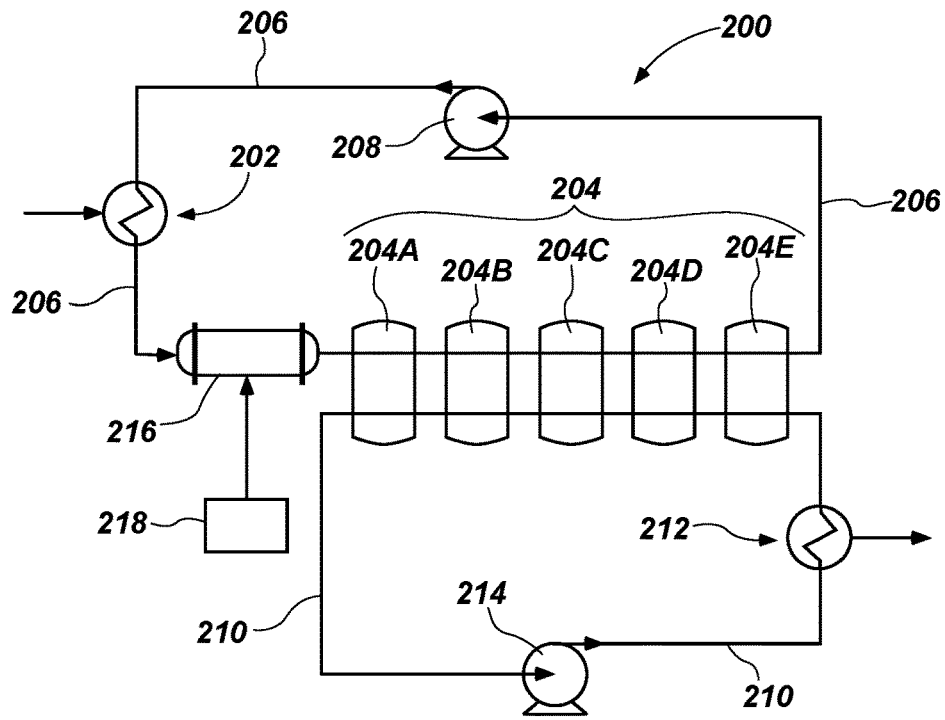
FIG. 3 shows a schematic representation of a thermal energy storage system according to an embodiment of the present disclosure.

FIG. 3 shows a schematic representation of a thermal energy storage system 200 according to an embodiment of the present disclosure. The thermal energy storage system 200 may be used as the thermal energy storage subsystem 114 in the hybrid energy system 100 of FIG. 2, for example. The thermal energy storage system 200 may include, on an input side thereof, at least one thermal energy source 202, a plurality of thermal energy storage tanks 204A-204E, (collectively referred to herein as reference 204 unless otherwise specified), a first HTF conduit 206 for conveying an HTF from the at least one thermal energy source 202 to the plurality of thermal energy storage tanks 204 and back to the at least one thermal energy source 202 for reheating, and a first pump 208 for pumping the HTF fluid through the first HTF conduit 206. The first HTF conduit 206 may be thermally insulated.

The thermal energy storage system 200 may also include, on an output side thereof, a second HTF conduit 210 thermally coupled to the plurality of thermal energy storage tanks 204 for conveying an HTF from the plurality of thermal energy storage tanks 204 to at least one heat consumption system 212. A second pump 214 may be operatively coupled to the second HTF conduit 210 for pumping the HTF within the second HTF conduit 210 from the plurality of thermal energy storage tanks 204 to the at least one heat consumption system 212 and back to the plurality of thermal energy storage tanks 204 for reheating. The second HTF conduit may be thermally insulated.

The at least one thermal energy source 202 of the thermal energy storage system 200 may be, for example, a nuclear reactor, a concentrated solar system, a fossil fuel plant, or any combination thereof. In operation, the HTF within the first HTF conduit 206 may be heated by the at least one thermal energy source 202 and conveyed to the plurality of thermal energy storage tanks 204. Such a transfer of thermal energy to the plurality of thermal energy storage tanks 204 may occur as desired, such as at times of low energy production costs and/or low energy demand. At other times, the flow of the HTF within the first HTF conduit 206 may be stopped, such as by a valve or by deactivating the first pump 208.

The plurality of thermal energy storage tanks 204 may contain respective thermal storage materials, such as molten salts (i.e., salts that are molten when heated for energy storage). The thermal storage materials may or may not be phase-change thermal storage materials. The thermal storage material within each of the thermal energy storage tanks 204 may be selected to have descending melting points. The thermal storage materials may be selected with melting point temperatures that are consistent with the application temperature. The materials may undergo freezing and melting as heat is drawn from or added to the plurality of thermal energy storage tanks 204. The latent heat of fusion associated with the liquid-solid phase-change may greatly increase the thermal capacity of the thermal energy storage system per unit volume of material. Thus, a first thermal energy storage tank 204A (i.e., the tank 204 furthest upstream on the first HTF conduit 206) of the plurality of thermal energy storage tanks 204 may contain a first thermal storage material having a highest melting point. A second tank 204B may contain a second, different thermal storage material having a melting point lower than the first thermal storage material. A third tank 204C may contain a third thermal storage material different from the first and second thermal storage materials and having a melting point lower than the second thermal storage material. Similarly, a fourth tank 204D and a fifth tank 204E may respectively contain a fourth thermal storage material and a fifth thermal storage material with descending melting points.

Thermal storage materials suitable for use with the plurality of thermal energy storage tanks 204 are known to those of ordinary skill in the art. In some embodiments, the thermal storage materials may include molten (i.e., when heated for energy storage) salts, such as, for example, one or more of the following combinations listed in descending order of approximate melting points: NaF and $Na_2CO_3$; LiF and $Li_2CO_3$; $Li_2CO_3$ and $K_2CO_3$; LiF and $K_2CO_3$; LiF, NaF, and KF; LiF, NaF, $Li_2CO_3$, and $K_2CO_3$; KCl and $MgCl_2$; LiF, NaF, and $K_2CO_3$; LiF, KF, and $K_2CO_3$; $Li_2CO_3$, $Na_2CO_3$, and $K_2CO_3$; KF and $ZrF_4$; LiF, $Na_2CO_3$, and $K_2CO_3$; LiF, NaF, $Na_2CO_3$, and $K_2CO_3$; $NaNO_3$ and $KNO_3$; and $NaNO_3$, $KNO_3$, and $Ca(NO_3)_2$. Each of the combinations of molten salts may optionally be configured as a eutectic composition. In some embodiments, the thermal storage materials may include a metal material, such as, for example: a combination of lead and bismuth; or sodium. In some embodiments, the thermal storage materials may or may not change phase when heated to store thermal energy.

Although the thermal energy storage system 200 is illustrated in FIG. 3 and described above as including five thermal energy storage tanks 204A-204E, embodiments of the present disclosure are not so limited. Rather, there may be only one thermal energy storage tank 204, at least two thermal energy storage tanks 204, or any number of thermal energy storage tanks 204 depending upon the application and expected use of the thermal energy storage system 200.

Optionally, in some embodiments, a heat booster 216 may be thermally coupled to the first HTF conduit 206 upstream of the plurality of thermal energy storage tanks 204 for supplemental heating of the HTF within the first HTF conduit 206. The heat booster 216 may be coupled to a supplemental energy source 218, such as a source of electricity for electrical heating and/or a source of fuel (e.g., natural gas) for flame heating. In embodiments in which the heat booster 216 is an electrical heater, the supplemental energy source 218 may be, for example, a thermal power conversion system, a wind turbine farm, and/or a PV solar panel system.

The heat booster 216 may be configured to heat the HTF within the first HTF conduit 206 and, consequently, the thermal storage materials in the plurality of thermal energy storage tanks 204 to a higher temperature than the at least one thermal energy source 202 alone. By way of illustration and not limitation, the at least one thermal energy source 202 may have sufficient thermal energy to heat the thermal storage material within the first thermal energy storage tank 204A to 450° C. However, it may be desired to heat the thermal storage material within the first thermal energy storage tank 204A to a temperature of 600° C., such as for a heat consumption system 212 that requires a temperature of, or operates more efficiently at, 600° C. In such a scenario, the heat booster 216 may be activated to increase a temperature of the HTF within the first HTF conduit 206 to a temperature sufficient to raise the temperature of the thermal storage material within the first thermal energy storage tank 204A to the desired 600° C. level.

Figure 4:
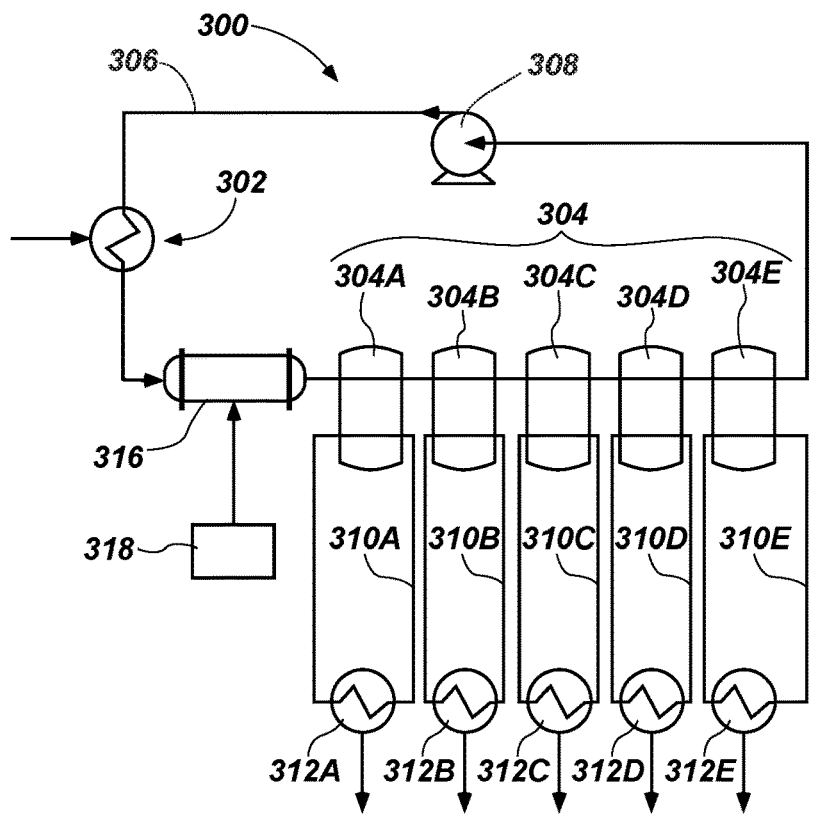
FIG. 4 shows a schematic representation of a thermal energy storage system according to another embodiment of the present disclosure.

Referring to FIG. 4, a thermal energy storage system 300 according to another embodiment of the present disclosure may include an input side similar to the thermal energy storage system 200 described above with reference to FIG. 3. For example, the thermal energy storage system 300 illustrated in FIG. 4 may include at least one thermal energy source 302, a plurality of thermal energy storage tanks 304A-304E, (collectively referred to herein as reference 304 unless otherwise specified), and a first HTF conduit for transferring an HTF heated by the at least one thermal energy source 302 to the plurality of thermal energy storage tanks 304. The plurality of thermal energy storage tanks 304 may contain respective thermal storage materials that exhibit descending melting points relative to one another. A first pump 308 may be operatively coupled to the first HTF conduit 306 to pump the HTF therein from the at least one thermal energy source 302 to the plurality of thermal energy storage tanks 304 and back to the at least one thermal energy source 302. Optionally, a heat booster 316 may be coupled to the first HTF conduit 306 upstream of the plurality of thermal energy storage tanks 304 to increase a temperature of the HTF within the first HTF conduit 306 when desired. A supplemental energy source 318 may be coupled to the heat booster 316 to provide a source of energy to the heat booster 316 for heating.

The thermal energy storage system 300 of FIG. 4 may include a plurality of output HTF conduits 310A-310E respectively coupled to the plurality of thermal energy storage tanks 304. For example, a first output HTF conduit 310A may be coupled to a first thermal energy storage tank 304A, a second output HTF conduit 310B may be coupled to a second thermal energy storage tank 304B, and so forth for the third, fourth, and fifth output HTF conduits 310C, 310D, 310E. Each output HTF conduit of the plurality of output HTF conduits 310A-310E may be coupled to a respective heat consumption system 312A-312E. As mentioned above, the plurality of thermal energy storage tanks 304 may contain respective thermal storage materials exhibiting descending melting points. Accordingly, a temperature of the respective thermal storage materials within the plurality of thermal energy storage tanks 304 may sequentially decrease.

The heat consumption systems 312A-312E respectively coupled to the output HTF conduits 310A-310E may be configured to consume thermal energy at different and descending temperatures. By way of example and not limitation, a first heat consumption system 312A may be a thermal power conversion system configured to convert thermal energy from the first thermal energy storage tank 304A at a first, relatively highest temperature. A second heat consumption system 312B may be an industrial chemical process system configured to convert thermal energy from the second thermal energy storage tank 304B at a second, relatively lower temperature. The other heat consumption systems 312C-312E may be additional industrial process systems configured to make use of thermal energy from the respective thermal energy storage tanks 304C-304E at respectively descending temperatures. Each output HTF conduit of the plurality of output HTF conduits 310A-310E may be individually operable, such as using a valve, pump, or other fluid control means, to transfer an HTF from the respective thermal energy storage tanks 304A-304E to the heat consumption systems 312 as desired or needed. Thus, thermal energy from the at least one thermal energy source 302 may be efficiently stored at variable temperatures within the plurality of thermal energy storage tanks 304 and consumed at those variable temperatures according to operating parameters of specific heat consumption systems 312A-312E (e.g., a thermal power conversion system, industrial process systems, etc.).

Additional non-limiting example embodiments of this disclosure are set forth below.

Embodiment 1

An energy storage system, comprising: a heat source; a thermal energy storage system operatively coupled to the heat source to store thermal energy produced by the heat source, the thermal energy storage system comprising: a first tank containing a first salt having a first melting temperature; and a second tank containing a second salt having a second melting temperature that is lower than the first melting temperature; at least one input conduit configured to transfer thermal energy from the heat source to the first tank and, thereafter, to the second tank; a first output conduit in thermal communication with the first tank, the first output conduit configured to transfer heat from the first tank to a first thermal process system; and a second output conduit in thermal communication with the second tank, the second output conduit configured to transfer heat from the second tank to a second thermal process system different from the first thermal process system.

Embodiment 2

The system of Embodiment 1, further comprising a heat booster coupled to the at least one input conduit to add thermal energy to a heat transfer fluid within the at least one input conduit prior to the heat transfer fluid entering the first tank.

Embodiment 3

The system of Embodiment 1 or Embodiment 2, wherein each of the first salt and the second salt comprises a combination of salts selected from the group consisting of: NaF and $Na_2CO_3$; LiF and $Li_2CO_3$; $Li_2CO_3$ and $K_2CO_3$; LiF and $K_2CO_3$; LiF, NaF, and KF; LiF, NaF, $Li_2CO_3$, and $K_2CO_3$; KCl and $MgCl_2$; LiF, NaF, and $K_2CO_3$; LiF, KF, and $K_2CO_3$; $Li_2CO_3$, $Na_2CO_3$, and $K_2CO_3$; KF and $ZrF_4$; LiF, $Na_2CO_3$, and $K_2CO_3$; LiF, NaF, $Na_2CO_3$, and $K_2CO_3$; $NaNO_3$ and $KNO_3$; and $NaNO_3$, $KNO_3$, and $Ca(NO_3)_2$.

Embodiment 4

An energy storage system, comprising: a heat source; a thermal energy storage system operatively coupled to the heat source to store thermal energy produced by the heat source, the thermal energy storage system comprising at least one tank containing at least one thermal storage material; at least one input conduit configured to convey a heated heat transfer fluid from the heat source to the at least one tank; at least one output conduit in thermal communication with the at least one tank and configured to transfer another heated heat transfer fluid from the at least one tank to at least one heat consumption system; and a heat booster positioned and configured to add thermal energy to the heated heat transfer fluid prior to the heated heat transfer fluid reaching the at least one tank.

Embodiment 5

The energy storage system of Embodiment 4, wherein the thermal storage material comprises at least one of a salt and a metal.

Embodiment 6

The energy storage system of Embodiment 4 or Embodiment 5, wherein the at least one tank containing at least one thermal storage material comprises a plurality of tanks containing a respective plurality of different thermal storage materials exhibit different melting temperatures.

Embodiment 7

The energy storage system of any one of Embodiments 4 through 6, wherein the plurality of tanks containing the respective plurality of different thermal storage materials comprises tanks containing thermal storage materials arranged in descending order of melting temperatures in a downstream direction relative to the at least one input conduit.

Embodiment 8

The energy storage system of any one of Embodiments 4 through 7, wherein the heat booster comprises at least one of an electrical heater or a flame heater.

Embodiment 9

A method of storing heat from at least one thermal energy source, the method comprising: transferring thermal energy from the at least one thermal energy source to a plurality of thermal energy storage tanks using a heat transfer fluid, the plurality of thermal energy storage tanks including at least a first thermal energy storage tank and a second thermal energy storage tank downstream of the first thermal energy storage tank relative to a flow of the heat transfer fluid; heating a first thermal storage material within the first thermal energy storage tank to a first temperature; heating a second thermal storage material within the second thermal energy storage tank to a second temperature lower than the first temperature; transferring thermal energy at the first temperature from the first thermal energy storage tank to a first heat consumption system; and transferring thermal energy at the second temperature from the second thermal energy storage tank to a second heat consumption system.

Embodiment 10

The method of Embodiment 9, further comprising: heating the heat transfer fluid with the at least one thermal energy source; and further heating the heat transfer fluid with a heat booster upstream of the first thermal storage material relative to the flow of the heat transfer fluid.

The embodiments of the disclosure described above and illustrated in the accompanying drawing figures do not limit the scope of the disclosure, since these embodiments are merely examples of embodiments of the disclosure. The disclosure is encompassed by the appended claims and their legal equivalents. Any equivalent embodiments lie within the scope of this disclosure. Indeed, various modifications of the present disclosure, in addition to those shown and described herein, such as other combinations and modifications of the elements described, will become apparent to those of ordinary skill in the art from the description. Such embodiments, combinations, and modifications also fall within the scope of the appended claims and their legal equivalents.

What is claimed is:

1. An energy storage system, comprising:
    a heat source;
    a thermal energy storage system operatively coupled to the heat source to store thermal energy produced by the heat source, the thermal energy storage system comprising a plurality of tanks containing a respective plurality of different thermal storage materials exhibiting different melting temperatures;
    at least one input conduit configured to convey a heated heat transfer fluid from the heat source to the at least one tank;
    at least one output conduit in thermal communication with the at least one tank and configured to transfer another heated heat transfer fluid from the at least one tank to at least one heat consumption system; and
    a heat booster positioned and configured to add thermal energy to the heated heat transfer fluid prior to the heated heat transfer fluid reaching the at least one tank.

2. The energy storage system of claim 1, wherein the thermal storage material comprises at least one of a salt and a metal.

3. The energy storage system of claim 1, wherein the plurality of tanks containing the respective plurality of different thermal storage materials comprises tanks containing thermal storage materials arranged in descending order of melting temperatures in a downstream direction relative to the at least one input conduit.

4. The energy storage system of claim 1, wherein the at least one output conduit comprises:
    a first output conduit in thermal communication with a first tank of the plurality of tanks; and
    a second output conduit in thermal communication with a second tank of the plurality of tanks.

5. The energy storage system of claim 4, wherein the first output conduit is configured to transfer heat from the first tank to a first thermal process system and the second output conduit is configured to transfer heat from the second tank to a second thermal process system different from the first thermal process system.

6. The energy storage system of claim 4, wherein the first output conduit is configured to transfer heat from the first tank at a first temperature and the second output conduit is configured to transfer heat from the second tank at a second temperature different from the first temperature.

7. The energy storage system of claim 1, wherein at least one thermal storage material of the plurality of different thermal storage materials comprises a first salt and a second salt, comprising a combination of salts selected from the group consisting of: NaF and $Na_2CO_3$; LiF and $Li_2CO_3$; $Li_2CO_3$ and $K_2CO_3$; LiF and $K_2CO_3$; LiF, NaF, and KF; LiF, NaF, $Li_2CO_3$, and $K_2CO_3$; KCl and $MgCl_2$; LiF, NaF, and $K_2CO_3$; LiF, KF, and $K_2CO_3$; $Li_2CO_3$, $Na_2CO_3$, and $K_2CO_3$; KF and $ZrF_4$; LiF, $Na_2CO_3$, and $K_2CO_3$; LiF, NaF, $Na_2CO_3$, and $K_2CO_3$; $NaNO_3$ and $KNO_3$; and $NaNO_3$, $KNO_3$, and $Ca(NO_3)_2$.

8. The energy storage system of claim 1, wherein the heat booster comprises at least one of an electrical heater or a flame heater.

9. The energy storage system of claim 1, wherein the plurality of tanks are located within about 8.05 km from the at least one heat consumption system.

10. The energy storage system of claim 1, wherein the plurality of tanks are located within about 1.61 km from the at least one heat consumption system.

11. The energy storage system of claim 1, wherein the plurality of tanks are located within about 0.8 km from the at least one heat consumption system.

12. A method of storing heat from at least one thermal energy source, the method comprising:
    transferring thermal energy from the at least one thermal energy source to a plurality of thermal energy storage tanks using a heat transfer fluid, the plurality of thermal energy storage tanks including at least a first thermal energy storage tank and a second thermal energy storage tank downstream of the first thermal energy storage tank relative to a flow of the heat transfer fluid;
    heating a first thermal storage material within the first thermal energy storage tank to a first temperature;
    heating a second thermal storage material within the second thermal energy storage tank to a second temperature lower than the first temperature;
    transferring thermal energy at the first temperature from the first thermal energy storage tank to a first heat consumption system; and
    transferring thermal energy at the second temperature from the second thermal energy storage tank to a second heat consumption system.

13. The method of claim 12, further comprising:
    heating the heat transfer fluid with the at least one thermal energy source; and
    further heating the heat transfer fluid with a heat booster upstream of the first thermal storage material relative to the flow of the heat transfer fluid.

14. The method of claim 13, wherein heating the heat transfer fluid with a heat booster comprises heating the heat transfer fluid with at least one of an electrical heater or a flame heater.

15. The method of claim 12, wherein heating the first thermal storage material comprises heating the first thermal storage material having a first melting temperature and heating the second thermal storage material comprises heating the second thermal storage material having a second melting temperature lower than the first melting temperature.

16. The method of claim 12, wherein transferring the thermal energy at the first temperature to the first heat consumption system comprises transferring the thermal energy to a thermal power conversion system.

17. The method of claim 12, wherein transferring the thermal energy at the second temperature to the second heat consumption system comprises transferring the thermal energy to an industrial chemical process system.

18. The method of claim 12, wherein heating the first thermal storage material and heating the second thermal storage material comprises heating at least one salt material.

19. The method of claim 12, wherein transferring thermal energy from the at least one thermal energy source to the plurality of thermal energy storage tanks comprises transferring thermal energy from multiple thermal energy sources to the plurality of thermal energy storage tanks.

* * * * *